US007133773B2

(12) United States Patent
Hamaguchi et al.

(10) Patent No.: US 7,133,773 B2
(45) Date of Patent: Nov. 7, 2006

(54) MAP DISTRIBUTION SYSTEM AND TERMINAL DEVICE USED IN THE SAME

(75) Inventors: Yoshihide Hamaguchi, Saitama (JP); Takeharu Arakawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 112 days.

(21) Appl. No.: 10/660,703

(22) Filed: Sep. 12, 2003

(65) Prior Publication Data

US 2004/0054465 A1    Mar. 18, 2004

(30) Foreign Application Priority Data

Sep. 13, 2002  (JP) ............................ P.2002-269168

(51) Int. Cl.
*G01C 21/30*  (2006.01)
(52) U.S. Cl. ..................... 701/208; 701/211; 701/212; 340/995.18; 340/995.19; 342/357.09
(58) Field of Classification Search ............... 701/200, 701/207–211, 212, 117; 340/988–993, 995.1, 340/995.12, 995.13, 995.14, 995.18, 995.19; 455/456.1, 456.2, 456.3, 456.4, 456.6, 457; 342/357.09
See application file for complete search history.

(56) References Cited

U.S. PATENT DOCUMENTS

| | | | | |
|---|---|---|---|---|
| 6,330,453 B1 * | 12/2001 | Suzuki et al. | ................ | 455/457 |
| 6,334,087 B1 * | 12/2001 | Nakano et al. | ............. | 701/208 |
| 6,400,690 B1 | 6/2002 | Liu et al. | .................... | 370/252 |
| 6,453,233 B1 * | 9/2002 | Kato | ........................... | 701/208 |
| 6,584,328 B1 * | 6/2003 | Kung | .......................... | 455/566 |
| 6,584,402 B1 * | 6/2003 | Fukushima et al. | ......... | 701/202 |
| 6,728,633 B1 * | 4/2004 | Mikuriya et al. | ........... | 701/208 |
| 6,738,711 B1 * | 5/2004 | Ohmura et al. | ............. | 701/208 |
| 6,879,909 B1 * | 4/2005 | Hirano et al. | ............... | 701/208 |
| 2004/0054462 A1 * | 3/2004 | Arakawa | ..................... | 701/200 |
| 2004/0054467 A1 * | 3/2004 | Sakai et al. | ................. | 701/209 |
| 2004/0172192 A1 * | 9/2004 | Knutson | ..................... | 701/208 |
| 2004/0199398 A1 * | 10/2004 | Kubota | .......................... | 705/1 |
| 2005/0015199 A1 * | 1/2005 | Lokshin et al. | ............. | 701/208 |

FOREIGN PATENT DOCUMENTS

EP       0 330 787 A2     9/1989

OTHER PUBLICATIONS

Patent Abstract of Japan, vol. 2002, No. 11, Nov. 6, 2002 & JP 2002 188927 A (Matsushita Electric Ind Co Ltd). Jul. 5, 2002.

* cited by examiner

*Primary Examiner*—Gertrude A. Jeanglaude
(74) *Attorney, Agent, or Firm*—Sughrue Mion, PLLC

(57) ABSTRACT

A map distribution system, includes an information center that stores the latest map information and a terminal device including a communication unit, a map storing unit, and a control information storing unit. The communication unit transmits information to the information center and receives information from the information center. The map storing unit stores map information. The control information storing unit stores control information associated with the map information. The terminal device transmits the control information to the information center every prescribed timings. The information center transmits the latest control information to the terminal device in response to the transmitted control information. The terminal device rewrites the control information stored in the control information storing unit to the latest control information.

6 Claims, 6 Drawing Sheets

FIG. 3

| PRIMARY MESH |
|---|
| CORRESPONDS TO RANGE OF BLOCK OF GEOGRAPHICAL MAP OF 1/200000, ABOUT 80km x 80km |
| SECONDARY MESH |
| CORRESPONDS TO RANGE OF BLOCK OF GEOGRAPHICAL MAP OF 1/25000, ABOUT 10km x 10km |

FIG. 4

| SECONDARY MESH FILE NO. 1 | | |
|---|---|---|
| CONTROL MAP INFORMATION | | UPDATE DATE |
| UNIT MAP (1) | ABOUT 1.2km x 1.2km | ×MONTH ×DATE |
| UNIT MAP (2) | ABOUT 1.2km x 1.2km | ×MONTH ×DATE |
| UNIT MAP (3) | ABOUT 1.2km x 1.2km | ×MONTH ×DATE |
| . | . | . |
| . | . | . |
| . | . | . |
| UNIT MAP (63) | ABOUT 1.2km x 1.2km | ×MONTH ×DATE |
| UNIT MAP (64) | ABOUT 1.2km x 1.2km | ×MONTH ×DATE |

| SECONDARY MESH FILE NO. 2 | | |
|---|---|---|
| CONTROL MAP INFORMATION | | UPDATE DATE |
| UNIT MAP (1) | ABOUT 1.2km x 1.2km | ×MONTH ×DATE |
| UNIT MAP (2) | ABOUT 1.2km x 1.2km | ×MONTH ×DATE |
| UNIT MAP (3) | ABOUT 1.2km x 1.2km | ×MONTH ×DATE |
| . | . | . |
| . | . | . |
| . | . | . |
| UNIT MAP (63) | ABOUT 1.2km x 1.2km | ×MONTH ×DATE |
| UNIT MAP (64) | ABOUT 1.2km x 1.2km | ×MONTH ×DATE |

FIG. 5A

| TERMINAL VERSION LIST | |
|---|---|
| SECONDARY MESH FILE NO. | UPDATE DATE |
| NO. 1 | ×MONTH ×DATE |
| NO. 2 | ×MONTH ×DATE |
| NO. 3 | ×MONTH ×DATE |
| NO. 4 | ×MONTH ×DATE |
| . | . |
| . | . |
| . | . |
| . | . |
| NO. 63 | ×MONTH ×DATE |
| NO. 64 | ×MONTH ×DATE |

FIG. 5B

| LATEST CENTER VERSION LIST | |
|---|---|
| SECONDARY MESH FILE NO. | UPDATE DATE |
| NO. 1 | ×MONTH ×DATE |
| NO. 2 | ×MONTH ×DATE |
| NO. 3 | ×MONTH ×DATE |
| NO. 4 | ×MONTH ×DATE |
| . | . |
| . | . |
| . | . |
| . | . |
| NO. 63 | △MONTH △DATE |
| NO. 64 | △MONTH △DATE |

FIG. 5C

| TERMINAL MAP UPDATING LIST | |
|---|---|
| SECONDARY MESH FILE NO. | UPDATE DATE |
| NO. 1 | ×MONTH ×DATE |
| NO. 2 | ×MONTH ×DATE |
| NO. 3 | ×MONTH ×DATE |
| NO. 4 | ×MONTH ×DATE |
| . | . |
| . | . |
| . | . |
| NO. 63 | ×MONTH ×DATE |
| NO. 64 | ×MONTH ×DATE |

MAP DISTRIBUTION SYSTEM AND TERMINAL DEVICE USED IN THE SAME

The present disclosure relates to the subject matter contained in Japanese Patent Application No. 2002-269168 filed Sep. 13, 2002, which is incorporated herein by reference in its entirety.

BACKGROUND OF THE INVENTION

1. Field of the Invention

The present invention relates to a map distribution system used for a navigation terminal or the like that is mounted on a vehicle and its terminal device.

2. Background Art

A car navigation system mounted on a vehicle as a typical mobile body serves to display a map on display means on the basis of the measured current position of the vehicle and display a mark showing the current position of the vehicle on the map in a superimposed manner.

In the car navigation system, measuring means for measuring the current position of the vehicle comprises a GPS (global positioning system) receiver or a self-contained navigation sensor for calculating the current position from the travel distance and the advancing direction of the vehicle or the like. Further, map information for displaying the map on the display means, accompanying information accompanying the map information and various kinds of functional services are adapted to be provided from an information center located outside the vehicle by using communication means mounted on the vehicle.

As described above, in the car navigation system, the latest map information can be obtained from the information center located outside the vehicle by using the communication means mounted on the vehicle.

However, in order to obtain the latest map information, it is expected that a communication cost for using the communication means be generated.

SUMMARY OF THE INVENTION

It is an object of the present invention to provide a terminal device in a map distribution system in which a wasteful map transmission is prevented from being received and the transmission of map information is efficiently received so that a communication cost can be suppressed.

To achieve the object, the invention provides A terminal device in a map distribution system, including: a communication unit configured to transmit information to an information center and to receive information from the information center; a map storing unit configured to store map information received by the communication unit; and a control information storing unit configured to store control information associated with the map information and received by the communication unit; wherein the control information is transmitted to the information center every prescribed timings; the communication unit receives latest control information which the information center transmits in response to the transmitted control information; and the control information stored in the control information storing unit is rewritten to the latest control information.

The invention provides a map distribution system, including: an information center that stores the latest map information; and a terminal device including a communication unit, a map storing unit, and a map storing unit; wherein the communication unit transmits information to the information center and receives information from the information center; the map storing unit stores map information received by the communication unit; the control information storing unit stores control information associated with the map information and received by the communication unit; the terminal device transmits the control information to the information center every prescribed timings; the information center transmits the latest control information to the terminal device in response to the control information transmitted from the terminal device; and the terminal device rewrites the control information stored in the control information storing unit to the latest control information.

The invention provides a computer program product in a terminal device of a map distributing system, including: means for storing map information; means for storing control information associated with the map information; means for transmitting the control information to an information center every prescribed timings; means for receiving latest control information which the information center transmits in response to the transmitted control information; and means for rewriting the stored control information to the latest control information.

The invention provides an updating method of map control information for a terminal device in a map transmitting system, wherein the terminal device includes: a measuring unit for measuring and determining the current position of a vehicle, a communication unit for transmitting information to and receiving information from an information center, a map storing unit for storing map information received by the communication unit, and a control information storing unit for storing control information associated with the map information received by the communication unit, the updating method including: transmitting the control information stored in the control information storing unit to the information center every prescribed timings, receiving latest control information transmitted from the information center; and rewriting the control information stored in the control information storing unit to the latest control information.

BRIEF DESCRIPTION OF THE DRAWINGS

The present invention may be more readily described with reference to the accompanying drawings:

FIG. 3 is a view for explaining a scale of the map information according to the embodiment of the present invention.

FIG. 4 is a view for explaining a control method of the map information according to the embodiment of the present invention.

FIGS. 5A–5C are views showing map control information according to the embodiment of the present invention.

DETAILED DESCRIPTION OF THE PREFERRED EMBODIMENTS

Now, an embodiment of the present invention will be described by referring to FIG. 1. The embodiment shown in FIG. 1 is an embodiment when a map distribution system and its terminal device are employed in a navigation system used for a vehicle.

Figure 1:
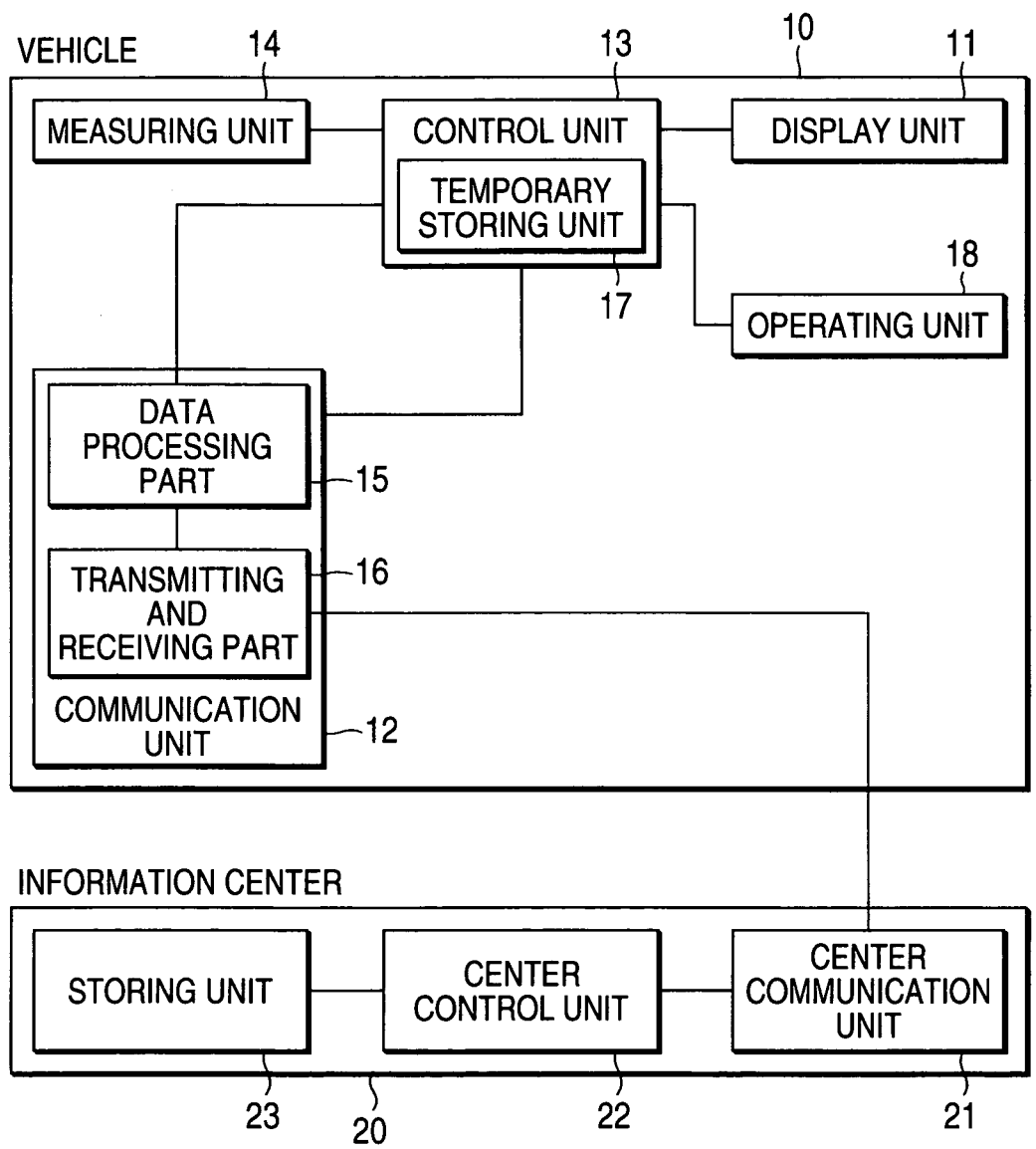
FIG. 1 is a block diagram of an embodiment of the present invention.

In FIG. 1, reference numeral 10 is a navigation terminal mounted on a vehicle side as a mobile body. The terminal device in the map distribution system of the present invention is mounted therein to transmit and receive, update and control a map. The navigation terminal 10 includes a display unit 11, a communication unit 12, a control unit 13 which functions as display control means for controlling the display unit 11, functions as connection control means for controlling the communication unit 12, and further functions as below-described map control information updating means and map updating means, a measuring unit 14 for measuring the current position of the vehicle and an operating unit 18 for inputting the designation of a destination or a command for executing a search for a route by a user. Further, the communication unit 12 includes a data processing part 15 for processing transmitted and received data and a transmitting and receiving part 16 for transmitting and receiving data.

Reference numeral 20 shows the structure of an information center side. The information center 20 includes a center communication unit 21 for performing a communication with the communication unit 12 mounted on the vehicle side and in which map information, service information and the map control information of each map information are stored. Further, the information center includes a storing unit 23 in which traffic information including the delay information, the regulating information or the accident information of roads, weather information including the present weather or the weather forecast of each area and various kinds of information of real time such as event information held at the present time or in future in each area are stored to so as to be accumulated. Further, the information center includes a center control unit 22 which functions as a center communication means control part for controlling a communication by the center communication unit 21, functions as a read control part for controlling the reading operation of various kinds of information from the storing unit 23 and further functions as a calculating part for calculating the travel route of the vehicle.

As described above, in the navigation system comprising the navigation terminal 10 and the information center 20, the map distribution system of the present invention is used. Various kinds of request commands are transmitted from the navigation terminal 10 to the information center 20 via a line for connecting the communication unit 12 to the center communication unit 21. Various kinds of information corresponding to the commands are transmitted to the navigation terminal 10 from the information center 20.

As a construction to be used as the line for connecting the communication unit 12 to the center communication unit 21, a portable telephone service system and a PHS telephone service system can be used. Further, as one example of the request commands transmitted to the information center 20 from the navigation terminal 10, a variety of information obtaining commands or function commands mounted on a usual navigation system may be exemplified. These commands include a map request command for obtaining the map information, a route calculation request command for calculating a travel route, a search request command for searching for facilities or spots, an information request command for obtaining various kinds of information such as traffic information, etc.

Here, the map request command in the navigation system including the map distribution system will be described in detail. The control unit 13 outputs map request information including present position information based on the present position of the vehicle measured by the measuring unit 14 and map reduced scale information or the like to the data processing part 15. After each information is converted to a prescribed form in the data processing part 15, the information is transmitted to the information center 20 through the transmitting and receiving part 16 as the map request command.

In the information center 20, the center control unit 22 reads the map information from the storing unit 23 based on the map request command obtained via the line for connecting the communication unit 12 to the center communication unit 21. Then, the center control unit 22 transmits the read map information to the navigation terminal 10 through the above-described line 10.

Then, in the navigation terminal 10, a map is displayed on the display unit 11 based on the map information obtained by the communication unit 12 through the above-described line. The control part 13 includes temporary storing means 17 for storing information and is adapted to store and hold below-described various kinds of information obtained from the information center 20 as well as the above-described map information, unless an erasing process is positively performed in accordance with an instruction of a user or the like.

In the navigation terminal 10, the map information received from the information center 20 is stored and accumulated in the temporary storing means 17 as described above so that a map data base can be constructed. Further, not only the map information received from the information center 20, but also a prescribed amount of map information may be previously (upon manufacturing a device or the like) stored in the temporary storing means 17 to construct the map data base. Further, the previously stored map information may be added to the map information received from the information center 20 to construct the map data base.

Now, a method for controlling and updating the map information relative to the map data base will be described in detail with reference to FIGS. 2 to 5.

Figure 2:
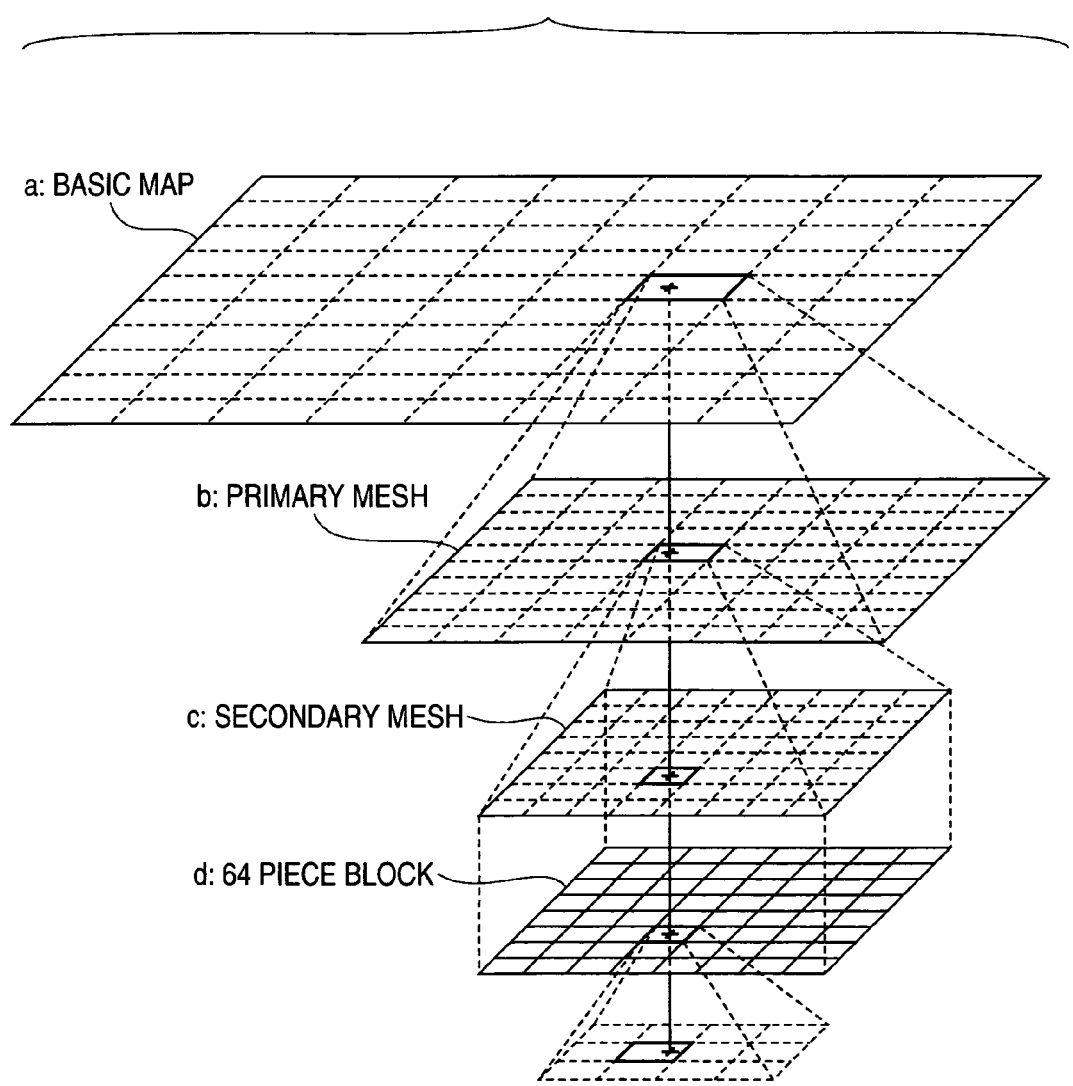
FIG. 2 is a conceptual view showing the structure of map information according to the embodiment of the present invention.

Initially, the structural concept of the map information used in this embodiment will be described by referring to FIG. 2.

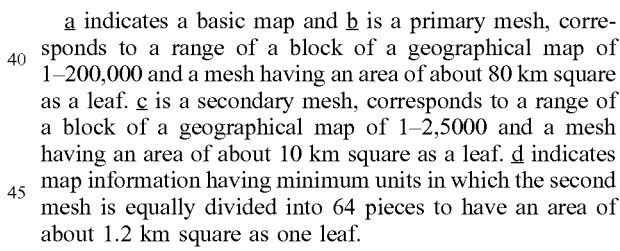

a indicates a basic map and b is a primary mesh, corresponds to a range of a block of a geographical map of 1–200,000 and a mesh having an area of about 80 km square as a leaf. c is a secondary mesh, corresponds to a range of a block of a geographical map of 1–2,5000 and a mesh having an area of about 10 km square as a leaf. d indicates map information having minimum units in which the second mesh is equally divided into 64 pieces to have an area of about 1.2 km square as one leaf.

In this embodiment, this minimum unit is a unit that can be updated when the map information is updated. The information center 20 updates the map to the latest data for each of minimum units capable of being updated. For example, when a facility or the like is newly constructed in the area of about 1.2 km square, the map information of the minimum unit capable of being updated in which the facility is included is updated in order to add a mark or information showing the facility thereto.

Also as shown in FIG. 3, the primary mesh b corresponds to the range of the block of the geographical map of 1–200,000 and is the mesh having the area of about 80 km square as one leaf.

Further, the secondary mesh corresponds to the range of the block of the geographical map of 1–2,5000 and is the mesh having the area of about 10 km square as one leaf.

On the other hand, upon controlling the map information having the minimum unit capable of being updated (an area of about 1.2 km square) as one leaf, when a file is controlled for each leaf, the number of files becomes enormous.

Therefore, a plurality of leaves (a plurality of meshes) is controlled for files as one group. A manner thereof is shown in FIG. 4.

As shown in FIG. 4, the map information having 64 leaves (64 meshes) of the minimum units capable of being updated is determined to be one group, so that the map information of one group has the same area as one leaf (one mesh) of the secondary mesh c. This one group is controlled as one secondary mesh file. Accordingly, a plurality of secondary mesh files in which the map information having 64 leaves (64 meshes) of the minimum units capable of being updated is determined to be one group is controlled.

The control method of the map is equal both in the navigation terminal 10 and the information center 20.

In FIGS. 5A–5C, version lists as one of control information associated with the map information are shown. A terminal version list shown in FIG. 5A is stored in the temporary storing means 17 in the navigation terminal 10. The terminal version list shows a list of the above-described secondary mesh file groups. File numbers and update dates thereof are listed.

FIG. 5B shows the latest center version list stored in the storing unit 23 in the information center 20. The latest center version list shows a list of the above-described secondary mesh file groups and file number and update dates thereof are listed. These update dates indicate dates when the secondary mesh files of the map information stored in the information center 20 are updated. That is, when even one of the maps of the minimum units capable of being updated included in the secondary mesh file is updated, the update date of the map becomes the update date of the secondary mesh file in which the map is included.

The navigation terminal 10 obtains the latest center version list at intervals of prescribed timings from the information center 20 and rewrites the terminal version list already stored in the temporary storing means 17 to the latest terminal version list on the basis of the obtained latest center version list. For example, when the update dates of the secondary mesh files of numbers 63 and 64 shown in FIG. 5B are newer than the update dates of the secondary mesh files of terminal version list numbers 63 and 64 shown in FIG. 5A, the update dates of the secondary mesh files of the numbers 63 and 64 shown in FIG. 5B are recorded as the update dates of the secondary mesh files of the terminal version list numbers 63 and 64 shown in FIG. 5A.

In such a manner, the terminal version list is always made the latest. This terminal version list is referred to and compared with map updating list shown in FIG. 5C for controlling the map information stored in the temporary storing means 17 of the navigation terminal 10. Thus, the map information stored in the information center 20 can be compared with the map information stored in the navigation terminal 10 to decide which is newer or older.

For example, the navigation terminal 10 obtains the latest center version list shown in FIG. 5B and compares this version list as the terminal version list with the map updating list shown in FIG. 5C. At this time, the navigation terminal can detect that the map information stored in the information center 20 is newer than the map information stored in the navigation terminal 10 in respect of the map information controlled in the second mesh files of the numbers 63 and 64. On the other hand, as for other map information, the navigation terminal can detect that the map information stored in the navigation terminal 10 is not different from the map information stored in the information center 20.

On the basis of such detected results, the navigation terminal can obtain only the map information stored in the information center 20 which is newer than the map information stored in the navigation center 10 from the information center 20. Thus, the map information can be updated in the navigation terminal 10.

When the map information is actually updated, the map information is updated for each secondary mesh file unit in which the map information having 64 leaves (64 meshes) of the minimum units capable of being updated is determined to be one group.

[Modified Embodiment]

In the above-described embodiment, the list of the secondary mesh files includes the terminal version list and the latest center version list. In addition thereto, the map information having the minimum units capable of being updated as a low-order level may be also listed to have likewise a terminal version list and the latest version list.

In this case, the terminal version list of as the list of the secondary mesh files is initially compared with the latest center version list in the navigation terminal 10. As a result, as for the secondary mesh files in the latest center version list newer than those of the terminal version list, the latest center version lists for map information having the minimum units capable of being updated included in the files are obtained. Then, on the basis of the latest center version lists, terminal version lists for map information having the minimum units capable of being updated of the navigation terminal 10 are updated.

Thus, in the map information having the minimum units capable of being updated stored in the navigation terminal 10, only the map information having the minimum units capable of being updated which is newer than the map information stored in the navigation terminal 10 and stored in the information center 20 is obtained from the information center 20. Then, the map information can be updated in the navigation terminal 10.

As described above, version information is prepared for each layered structure of a map corresponding to the scale of one leaf of the map information. Accordingly, the map information can be finely controlled and whether the map information is new or old can be recognized and information can be updated in an arbitrary layer.

In all the embodiments described above, a computer program may be formed and a computer may be realized to have the same functions by the computer program.

What is claimed is:

1. A terminal device in a map distribution system, comprising:

a communication unit configured to transmit information to an information center that distributes map information and to receive information from the information center;

a map storing unit configured to store the map information received by the communication unit;

a control information storing unit configured to store control information associated with the map information stored in the map storing unit;

a communication control unit configured to control the communication unit to transmit the control information stored in the control information storing unit to the information center on prescribed times so as to receive latest control information transmitted from the information center;

a control unit configured to rewrite the control information stored in the control information storing unit to the latest control information; and a map updating unit configured to determine that the map information stored in the map storing unit is to be updated when the map updating unit compares the map information stored in the information center and the map information stored in the map storing unit while referring to the control information stored in the control information storing unit and judges that the map information stored in the information center is newer than the map information stored in the map information storing unit.

2. The terminal device according to claim 1, wherein the control information includes information of update dates on which the map information was updated in the information center.

3. The terminal device according to claim 1, wherein the map updating unit updates the map information on a map update unit basis, the map update unit including at least one of a minimum unit map group capable of being updated.

4. The terminal device according to claim 3, wherein the control information controls the map information on each map update unit basis.

5. A map distribution system, comprising:
an information center that distributes map information; and
a terminal device including a communication unit configured to transmit information to the information center and to receive information from the information center, a map storing unit configured to store the map information received by the communication unit, and a control information storing unit configured to store control information associated with the map information stored in the map storing unit map storing unit, wherein
the terminal device transmits the control information to the information center on prescribed times,
the information center transmits latest control information to the terminal device in response to the control information transmitted from the terminal devices, and
the terminal device rewrites the control information stored in the control information storing unit to the latest control information, and updates the map information stored in the map storing unit with the map information obtained from the information center when the terminal device compares the map information stored in the information center and the map information stored in the map storing unit while referring to the control information stored in the control information storing unit and judges that the map information stored in the information center is newer than the map information stored in the map information storing unit.

6. An updating method of a terminal device in a map distribution system including a communication unit configured to transmit information to an information center that distributes map information and to receive information from the information center, a map storing unit configured to store the map information received by the communication unit, and a control information storing unit configured to store control information associated with the map information stored in the map storing unit, the updating method comprising:
transmitting the control information stored in the control information storing unit to the information center on prescribed times;
receiving latest control information transmitted from the information center in response to the transmitting of the control information;
rewriting the control information stored in the control information storing unit to the latest control information;
comparing the map information stored in the information center and the map information stored in the map storing unit while referring to the control information stored in the control information storing unit and judging whether the map information stored in the information center is newer than the map information stored in the map information storing unit; and
updating the map information stored in the map storing unit with the map information obtained from the information center when it is judged that the map information stored in the information center is newer than the map information stored in the map information storing unit.

* * * * *